US011233419B2

(12) United States Patent
Hendrix et al.

(10) Patent No.: US 11,233,419 B2
(45) Date of Patent: Jan. 25, 2022

(54) SMART BATTERY CIRCUIT

(71) Applicant: Zoox, Inc., Menlo Park, CA (US)

(72) Inventors: Austin Hendrix, Redwood City, CA (US); Moritz Boecker, Millbrae, CA (US); Robert Edward Somers, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 15/674,098

(22) Filed: Aug. 10, 2017

(65) Prior Publication Data

US 2019/0052119 A1 Feb. 14, 2019

(51) Int. Cl.
*H02J 7/34* (2006.01)
*B60L 58/20* (2019.01)
(Continued)

(52) U.S. Cl.
CPC .......... *H02J 7/342* (2020.01); *B60L 15/2045* (2013.01); *B60L 50/60* (2019.02); *B60L 58/12* (2019.02); *B60L 58/19* (2019.02); *B60L 58/20* (2019.02); *B60L 58/21* (2019.02); *B60L 58/22* (2019.02); *B60R 16/02* (2013.01); *H02J 3/00* (2013.01); *H02J 3/30* (2013.01); *H02J 3/32* (2013.01);
(Continued)

(58) Field of Classification Search
CPC ..... H02J 7/34; H02J 7/342; H02J 1/00; B60L 11/1855; B60L 2260/54; B60L 50/60; B60L 2240/60; B60L 2240/64
USPC ..................... 307/10.1, 43, 44, 85
See application file for complete search history.

(56) References Cited

U.S. PATENT DOCUMENTS 4,931,947 A * 6/1990 Werth ................. H01M 16/006
700/297
6,229,279 B1 5/2001 Dierker
(Continued)

FOREIGN PATENT DOCUMENTS

DE 102011109709 A1 2/2013
EP 2717415 A1 4/2014
(Continued)

OTHER PUBLICATIONS

PCT Search Report and Written Opinion dated Nov. 1, 2018, for PCT Application No. PCT/US18/44300, 7 pages.
(Continued)

*Primary Examiner* — Adi Amrany
(74) *Attorney, Agent, or Firm* — Lee & Hayes, P.C.

(57) ABSTRACT

An electrical system may include a power circuit configured to provide a power output, first and second batteries, and first and second switches configured to connect and disconnect the first and second batteries, respectively, to the power output in parallel with one another. The electrical system may also include a controller electrically connected to the first and the second switches, and configured to control operation of the first switch and/or the second switch. The electrical system may also include a load predictor in communication with the controller and configured to predict power demands of an electric load on the power circuit and send a signal indicative of the predicted power demands to the controller, which may activate the first switch and/or the second switch to connect the first battery and/or the second battery to the power output based at least in part on the signal indicative of the predicted load.

14 Claims, 5 Drawing Sheets

(51) Int. Cl.
*B60L 58/22* (2019.01)
*B60L 58/12* (2019.01)
*B60L 58/21* (2019.01)
*B60L 58/19* (2019.01)
*B60L 50/60* (2019.01)
*H02J 7/00* (2006.01)
*H02J 3/30* (2006.01)
*B60R 16/02* (2006.01)
*H02J 3/32* (2006.01)
*B60L 15/20* (2006.01)
*H02J 3/00* (2006.01)
*H02P 31/00* (2006.01)

(52) U.S. Cl.
CPC .......... *H02J 7/0016* (2013.01); *H02J 7/0018* (2013.01); *H02J 7/0019* (2013.01); *H02J 7/0021* (2013.01); *H02J 7/34* (2013.01); *H02P 31/00* (2013.01); *B60L 2240/54* (2013.01); *B60L 2240/60* (2013.01); *B60L 2240/64* (2013.01); *B60L 2260/54* (2013.01)

(56) References Cited

U.S. PATENT DOCUMENTS

| | | | | |
|---|---|---|---|---|
| 7,362,005 B2* | 4/2008 | Leblanc | ............... | F02N 11/0866 307/10.1 |
| 7,696,716 B2 | 4/2010 | Siddiqui et al. | | |
| 8,543,270 B2 | 9/2013 | Kelty et al. | | |
| 9,037,334 B1 | 5/2015 | Cole | | |
| 9,057,621 B2* | 6/2015 | Tate, Jr. | ............. | G01C 21/3469 |
| 9,067,589 B1* | 6/2015 | Zhao | .................... | B60W 10/06 |
| 9,428,075 B2 | 8/2016 | Fukui et al. | | |
| 10,464,547 B2* | 11/2019 | Park | ..................... | B60W 50/14 |
| 10,513,193 B2* | 12/2019 | Kudo | .................... | H02J 7/0027 |
| 2008/0007224 A1* | 1/2008 | Melichar | ............ | G01R 31/3648 320/132 |
| 2011/0049977 A1* | 3/2011 | Onnerud | ............... | B60L 3/0046 307/9.1 |
| 2011/0127964 A1* | 6/2011 | Nishida | ............... | H01M 10/441 320/118 |
| 2011/0234150 A1* | 9/2011 | Furukawa | ............ | H02J 7/0027 320/101 |
| 2012/0109515 A1* | 5/2012 | Uyeki | ................ | G01C 21/3469 701/423 |
| 2012/0313439 A1* | 12/2012 | Yamaguchi | ......... | H01M 10/465 307/71 |
| 2013/0229153 A1* | 9/2013 | Sarkar | ..................... | B60L 50/52 320/130 |
| 2013/0278052 A1* | 10/2013 | Butzmann | ........... | H01M 10/441 307/9.1 |
| 2014/0103859 A1* | 4/2014 | Nishi | .................... | H02J 7/0016 320/103 |
| 2014/0110183 A1 | 4/2014 | Rudakevych et al. | | |
| 2014/0175886 A1* | 6/2014 | Kwok | ....................... | H02J 7/34 307/46 |
| 2014/0265560 A1* | 9/2014 | Leehey | ................... | B60L 58/13 307/10.1 |
| 2014/0277931 A1* | 9/2014 | Crowe | .................... | B60L 1/003 701/36 |
| 2014/0350811 A1* | 11/2014 | Tamaru | ................. | B60W 10/02 701/68 |
| 2015/0266414 A1* | 9/2015 | Bailey | ...................... | B60Q 1/44 340/467 |
| 2015/0266483 A1 | 9/2015 | Williams | | |
| 2015/0273995 A1* | 10/2015 | Muto | ....................... | B60L 7/14 180/68.5 |
| 2015/0275750 A1* | 10/2015 | Algrain | .................. | F02B 63/04 307/48 |
| 2016/0097652 A1* | 4/2016 | Liu | ..................... | G01C 21/3469 701/423 |
| 2017/0141589 A1 | 5/2017 | Inoue et al. | | |
| 2017/0227369 A1* | 8/2017 | Wang | .................. | G01C 21/3469 |
| 2017/0297433 A1* | 10/2017 | Shibachi | ............... | B60L 3/0092 |
| 2018/0050701 A1* | 2/2018 | Grinenval | ............. | B60W 40/08 |
| 2018/0154779 A1* | 6/2018 | Chol | ..................... | B60L 11/005 |
| 2018/0195870 A1* | 7/2018 | Miller | ................ | G01C 21/3469 |
| 2018/0257473 A1* | 9/2018 | Follen | ...................... | B60K 6/22 |
| 2019/0004526 A1* | 1/2019 | Soliman | .............. | B60W 60/001 |
| 2019/0049952 A1* | 2/2019 | Miller | ................ | G01C 21/3492 |
| 2019/0074698 A1* | 3/2019 | Singhal | .................. | H02J 7/0013 |
| 2019/0092257 A1* | 3/2019 | Boecker | .................. | B60R 16/03 |
| 2019/0160972 A1* | 5/2019 | Zeiler | ................... | H01M 10/44 |

FOREIGN PATENT DOCUMENTS

| | | |
|---|---|---|
| EP | 2993724 A1 | 3/2016 |
| EP | 3070812 A1 | 9/2016 |
| GB | 2537616 A | 10/2016 |
| WO | WO2011114247 A1 | 9/2011 |

OTHER PUBLICATIONS

EP Search Report from corresponding EP Application No. 188438501 dated Mar. 18, 2021, 10 pages.

\* cited by examiner

US 11,233,419 B2

SMART BATTERY CIRCUIT

BACKGROUND

Many devices and machines are powered by batteries. For example, electronic devices such as cameras, smartphones, tablets, portable speaker systems, and computers may be operated without the inconvenience of power cords by using a battery. In addition, medical devices, such as defibrillators, vital sign monitoring devices, and life support systems, may be portable and powered by a battery or include battery back-ups. The popularity of electric-powered vehicles at least partially relying on battery power has increased as well.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
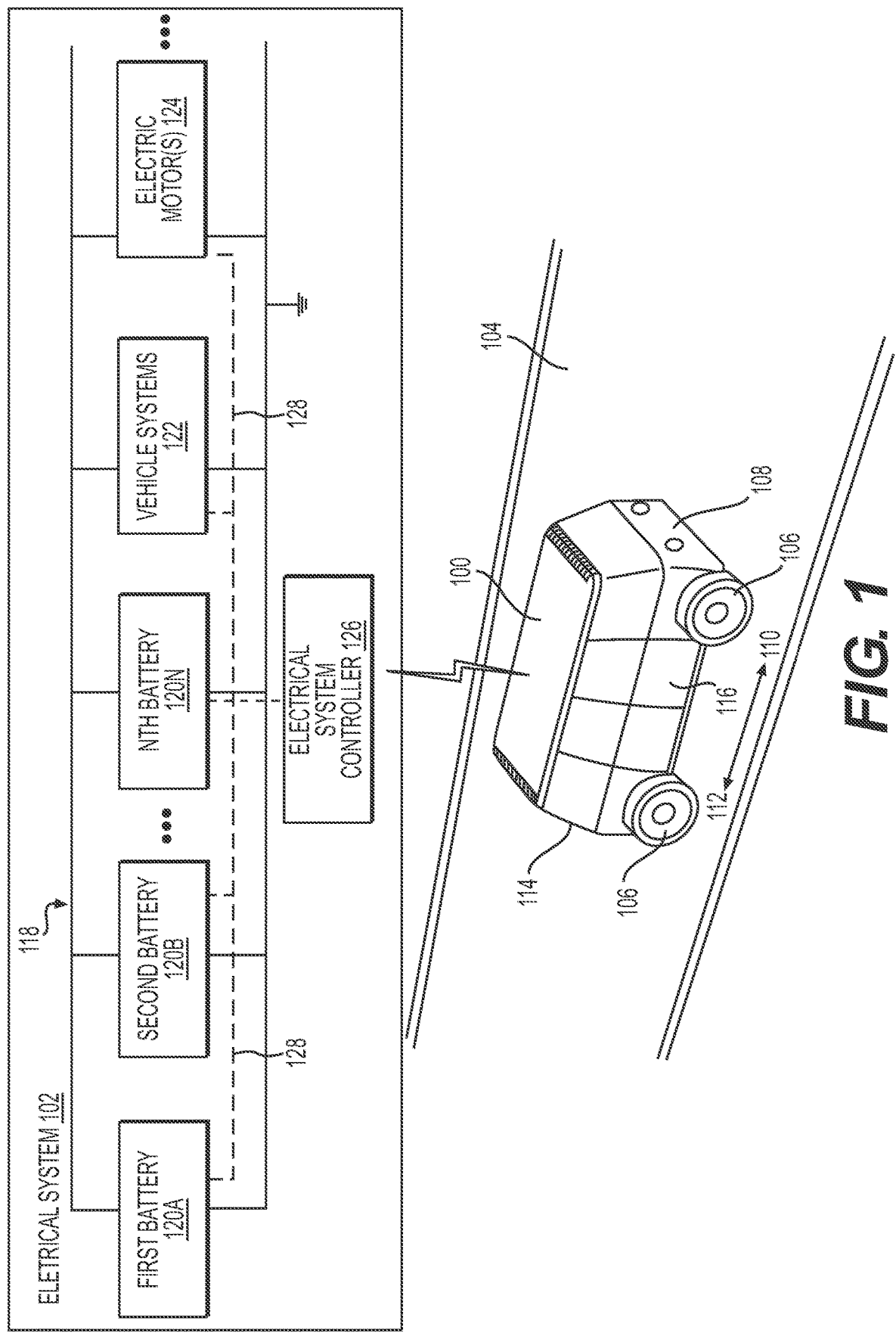
FIG. 1 is a perspective view of an example vehicle including an example electrical system shown in block diagram form.

This disclosure is generally directed to an electrical system configured to supply electric power to an electric load. For example, the electrical system may be used to supply electric power to devices and machines, such as, for example, electronic devices, medical devices, and electric-powered vehicles that at least partially rely on batteries for electrical power.

The electrical system in some examples may include a power circuit configured to provide a power output. The electrical system may also include a first battery electrically connectable to the power output of the power circuit, and a first switch configured to selectively electrically connect the first battery to, and disconnect the first battery from, the power output. The power circuit may also include a second battery electrically connectable to the power output, and a second switch configured to selectively electrically connect the second battery to, and disconnect the second battery from, the power output. In some examples, the power circuit may be configured such that when the first switch and the second switch electrically connect the first battery and the second battery, respectively, to the power circuit, the first battery and the second battery are in parallel with one another in the power circuit. In some examples, the power output of the power circuit may be configured to supply electric power to a load from only the first battery, but not the second battery, electrically connected to the power output. In some examples, the power output of the power circuit may be configured to supply electric power to a load from only the second battery, but not the first battery, electrically connected to the power output. In some examples, both the first battery and the second battery may be electrically connected to the power output and supply electric power to a load. Some examples of the electrical system may include more than two batteries.

In some examples, the electrical system may also include a controller electrically connected to the first switch and the second switch. The controller may be configured to control operation of one or more of the first switch or the second switch. Some examples of the electrical system may include a separate controller for each of the first battery and the second battery, and for examples including more than two batteries, the electrical system may include more than two controllers, such as, for example, one controller for each of the batteries.

The electrical system may also include an electric load connected to the power output of the power circuit, such that at least one of the first battery or the second battery supplies power to the electric load. The electric load may include any electrically-powered device or machine, for example, as described herein.

The electrical system may also include a load predictor in communication with the controller. In some examples, the load predictor may be configured to predict power demands of the electric load and send one or more signals indicative of the predicted power demands to the controller. As described herein, the load predictor may use various information, for example, historical, geographic, and/or real-time information, to predict future load demands of the electric load. In some examples, the controller may be configured to activate one or more of the first switch or the second switch to connect one or more of the first battery or the second battery, respectively, to the power output of the power circuit based at least in part on the one or more signals indicative of the predicted power demands.

Some examples of the electrical system described herein may result in providing power redundancy, for example, such that if one battery is unable to provide the requisite power (e.g., has a low state of charge, a depleted charge, or insufficient voltage), another battery of the system may continue to supply electric power to the device or machine. For example, if one battery of an electrically-powered vehicle is unable to supply power, another one of the batteries may supply power, so that the vehicle may continue to operate. Some examples of the electrical system described herein may operate more efficiently than an electrical system having a single battery of a similar capacity to the capacity of the combined batteries of the electrical system described herein. For example, relatively smaller batteries of the electrical systems described herein may take advantage of relatively reduced inefficiencies, such as reduced internal resistance relative to a single, larger battery having a capacity corresponding to the combined capacity of the smaller batteries. Some examples of the electrical systems described herein may have relatively reduced recharge times, for example, due to their relatively smaller capacities relative to a single larger battery. This may be beneficial for devices and machines that are used and recharged repeatedly. In addition, some electrical systems described herein may be able to operate effectively at lower states of charge relative to a single, larger battery, which may improve the useful battery life for a given full charge. Some examples may provide an opportunity to distribute battery weight within a device or machine, for example, by separating the locations of the respective batteries of the electrical systems described herein. Such a characteristic may be beneficial for an electric-powered vehicle, for which tailored weight distribution may contribute to improvements in operation and/or handling of the vehicle.

In some examples, the load predictor may be configured to receive one or more signals from at least one of a planner configured to determine trajectories of a vehicle coupled to the power output or a vehicle controller configured to determine power demands associated with an electric motor of the vehicle coupled to the power output. The load predictor may also be configured to predict the power demands based at least in part on the one or more signals.

In some examples, the load predictor may be configured to receive one or more signals from a planner configured to determine trajectories of a vehicle coupled to the power output. The determined trajectories may include a trajectory associated with operation of the vehicle on a highway, a trajectory associated with operation of the vehicle on a side street, a trajectory associated with operation of the vehicle up a hill, and/or a trajectory associated with operation of the vehicle on a street including a plurality of traffic signals. Other types of trajectories are contemplated. The load predictor, in some examples, may be configured to predict a relatively high power demand for the trajectory associated with operation of the vehicle on the highway, a relatively low power demand for the trajectory associated with operation of the vehicle on the side street, a relatively high power demand associated with the trajectory associated with operation of the vehicle up the hill, and/or a relatively high power demand for the trajectory associated with operation of the vehicle on the street including the plurality of traffic signals.

In some examples, the controller may be configured to receive a first signal indicative of a first state of charge associated with the first battery and a second signal indicative of a second state of charge associated with the second battery. The state of charge of a battery may correlate to a voltage of the battery. The controller may control operation of one or more of the first switch or the second switch, such that the first state of charge and the second state of charge are equalized. In some examples, the first battery and the second battery may be in parallel with one another, and if the difference between the state of charge of the first battery and the state of charge of the second battery is excessive (e.g., greater than a threshold difference), electrically connecting the first battery and the second battery to one another in parallel may result in a large current surge that may damage portions of the electrical system. Thus, controlling equalization of the states of charge of the first battery and the second battery may be desirable. The state of charge of the batteries may be determined according to known methods, such as, for example, determining the voltage of the battery, receiving a signal indicative of the state of charge from battery controller capable of providing such a signal, determining the internal resistance of the battery and the current output (e.g., via estimation based on historical data), and/or estimating the state of charge based on other factors, such as temperature, etc.

Some examples of the electrical system may also include a first secondary switch and a first load electrically connected in parallel with the first switch, and a second secondary switch and a second load electrically connected in parallel with the second switch. In some such examples, the controller may be configured to determine that either the first battery or the second battery has a higher state of charge and designate the battery having the higher state of charge as the higher state of charge battery and the battery having the lower state of charge as the lower state of charge battery. The controller may also be configured cause either the first switch or the second switch associated with the higher state of charge battery to electrically connect the higher state of charge battery to the power output of the power circuit. The controller may also cause either the first secondary switch or the second secondary switch to electrically connect the lower state of charge battery to the higher state of charge battery, thereby charging the lower state of charge battery via the higher state of charge battery.

In some examples, the controller may be configured to determine that a difference between the state of charge of the lower state of charge battery and the state of charge of the higher state of charge battery is below a threshold difference, and cause either the first switch or the second switch associated with the lower state of charge battery to connect the lower state of charge battery to the power output of the power circuit. In those examples where a difference in state of charge is above a threshold difference, such a controller may selectively cause the higher state of charge battery to discharge through a load until the states of charge are within the specified threshold. For example, the load may be supplied with power by only the higher state of charge battery until the states of charge are within the specified threshold difference. The threshold difference may be affected by the internal resistance of the battery having the higher state of charge. For example, when the higher state of charge battery is providing power to the load, its apparent voltage is lower than when unloaded due for example, to the internal resistance of the higher state of charge battery. When the apparent voltage (or state of charge) of the higher state of charge battery drops to a level substantially equal to the voltage level (or state of charge) of the lower state of charge battery, the previously lower state of charge battery may be electrically connected to the power output of the power circuit, for example, in parallel with the previously higher state of charge battery.

In some examples, the controller may be configured to cause either the first secondary switch or the second secondary switch to electrically connect the lower state of charge battery to the higher state of charge battery based at least in part on the one or more signals indicative of the predicted power demands. For example, the load predictor may be configured to predict a first level of predicted power demand at a first time period, and predict a second level of predicted power demand at a second time period. In some such examples, the controller may be configured to identify either the first level or the second level as being lower, and cause, during either the first time period or the second time period associated with the lower level, either the first secondary switch or the second secondary switch to electrically connect the lower state of charge battery to the higher state of charge battery, thereby charging the lower state of charge battery via the higher state of charge battery during the time period of lower level predicted power demand. This may result in charging the battery having the lower state of charge during a time period in which the power load on the power circuit is reduced relative to other time periods. This may result in more efficiently charging the battery having the lower state of charge relative charging the battery during time periods at which there are higher power loads on the power circuit.

Some examples of the electrical system may also include a first charging circuit electrically coupled to the power output of the power circuit in parallel with the first battery to supply charge to the first battery, and a second charging circuit electrically coupled to the power output in parallel with the second battery to supply charge to the second battery. In some such examples, the controller may be configured to operate one or more of the first switch or the second switch to cause charging of one or more of the first battery or the second battery concurrently (e.g., substantially simultaneously) or independently of one another. In some examples, a single charger may be used to charge either or both the first battery and the second battery concurrently (e.g., substantially simultaneously). In examples having more than two batteries, the electrical system may include more than two charge circuits, which may be connected to more than two chargers and to each of the batteries.

Some examples of the electrical system may include more than one controller. For example, a first controller may be electrically connected to the first switch, and a second controller may be electrically connected to the second switch. The first controller may be configured to activate the first switch to connect the first battery to the power output based at least in part on the one or more signals indicative of the predicted power demands. The second controller may be configured to activate the second switch to connect the second battery to the power output of the power circuit based at least in part on the one or more signals indicative of the predicted power demands. In some examples, the first controller and the second controller may be configured to communicate with one another, for example, so that they may coordinate operation of the first and second switches.

This disclosure is also generally directed to a vehicle including a chassis and one or more electric motors coupled to the chassis and configured to provide torque for propulsion of the vehicle. The vehicle may also include an electrical system configured to supply electric power to the one or more electric motors and/or other electrically-operated devices and systems of the vehicle, such as, for example, the electrical systems described herein. In some examples, the vehicle may be an autonomous vehicle configured to travel without control from a driver between two locations. Other types of vehicles are contemplated.

In some examples of the vehicle, a load predictor may be configured to predict power demands of the one or more electric motors and send one or more signals indicative of the predicted power demands to the controller. For example, the load predictor may receive one or more signals associated with a predicted route and/or predicted operation of the vehicle, and determine the predicted power demands based at least in part on the signal(s), for example, as described herein. For example, during operation on side streets when the speed of the vehicle is predominately lower (e.g., 45 mph or less), the power demands of the one or more electric motors may be lower relative to power demands during driving at highway speeds (e.g., 55 mph to 70 mph). Some examples of the load predictor may use the predicted route of the vehicle to provide one or more signals indicative of predicted power demands to the controller, which may control operation of one or more of the switches of the electrical system to charge a battery having a lower state of charge and/or voltage during time periods of reduced power demands using a battery having a higher charge and/or voltage. In some examples, the vehicle may be configured to alter its predicted route and/or operation to adjust (e.g., reduce) the predicted power demands, for example, during charging of one or more of the batteries with one or more batteries having a higher charge. For example, if the electrical system is charging one of the batteries using a battery having a higher state of charge and/or voltage, control systems of the vehicle may change its route to a route that would be predicted to have lower power demands. For example, a planned route on a highway to reach a destination may be changed to a route using side streets to reach the destination. In some examples, map data and/or onboard sensor data, which indicate road conditions (e.g., inclination, friction, etc.) or perception systems onboard such a vehicle (e.g., those systems that can interpret camera, LIDAR, RADAR data, etc.), which indicate an obstacle in the road, may require a large amount of power to perform an immediate action, maneuver, etc. by the vehicle. In such examples, map data, perception data, and/or onboard sensor data may be used by such a load predictor to optimize cell balancing.

In some examples, the vehicle may also include a planner configured to determine trajectories for operation of the vehicle. In some such examples, the load predictor may be configured to receive one or more signals indicative of the determined trajectories, and predict the power demands associated with respective determined trajectories based at least in part on the one or more signals. The load predictor may also be configured to identify a lowest predicted power demand from among the predicted power demands associated with the respective determined trajectories, and send one or more signals indicative of the lowest predicted power demand and respective determined trajectory to the planner for use in selecting a trajectory for operating the vehicle. In this example manner, the load predictor may provide information to the planner, so that the planner selects a trajectory having lower predicted loads for operation of the vehicle. This may facilitate more efficient charging of a lower state of charge battery from a higher state of charge battery during operation of the vehicle.

In some examples, the controller may be configured to determine a first state of charge of the first battery and a second state of charge of the second battery, and send one or more signals indicative of the first state of charge and/or the second state of charge to the planner for use in selecting a trajectory for operating the vehicle. In this example manner, the load predictor may provide information to the planner, so that the planner selects a trajectory that accounts for (or is tailored to) the states of charge of the batteries.

In some examples, the electrical system of the vehicle may include a first secondary switch and a first current limiting device electrically connected in parallel with the first switch. The electrical system may also include a second secondary switch and a second current limiting device electrically connected in parallel with the second switch. In some such electrical systems of the vehicle, the controller may be configured to determine that either the first battery or the second battery has a higher state of charge and designate the battery having a higher state of charge as the higher state of charge battery and the other battery as the lower state of charge battery. The current limiting devices may include any device or group of devices that serves to regulate current, such as, for example, one or more resistors, one or more electric loads, and/or one or more devices that dissipate electric load. The controller may also cause the switch associated with the higher state of charge battery to electrically connect the higher state of charge battery to the power output of the power circuit, and cause the secondary switch associated with the lower state of charge battery to connect the lower state of charge battery to the higher state of charge battery, thereby charging the lower state of charge battery via the higher state of charge battery. The controller may also determine that the difference between the state of charge of the lower state of charge battery and the state of charge of the higher state of charge battery is below a threshold difference, and cause the switch (e.g., the first switch or the second switch) associated with the lower state of charge battery to connect the lower state of charge battery to the power output of the power circuit, for example, to output power to the power output of the power circuit. In some examples, threshold difference may be a predetermined voltage difference, or voltage difference calculated in real-time, that is sufficiently low to prevent excessive heating and/or damage to components of the electrical system when the lower state of charge battery is coupled to the power output and the higher state of charge battery. In some examples, this may be based at least in part on the voltage and/or current capacities of the components of the electrical system and/or engineering safety factors. In some examples, the controller may be configured to cause the secondary switch associated with the lower state of charge battery to electrically connect the lower state of charge battery to the higher state of charge battery based at least in part on the signal indicative of the predicted power supply, for example, as described herein.

In some examples, the controller may be configured to cause the first switch or the second switch associated with the higher state of charge battery to electrically connect the higher state of charge battery to the power output of the power circuit to supply electric power for operation of the vehicle, and cause the other of the first switch or the second switch associated with the lower state of charge battery to electrically disconnect the lower state of charge battery from the power output of the power circuit until the state of charge of the higher state of charge battery and the state of charge of the lower state of charge battery substantially equalize. In some examples, the controller may be configured to cause a secondary switch to electrically connect the higher state of charge battery to the lower state of charge battery through a current limiting device to charge the lower state of charge battery from the higher state of charge battery until the states of charge of the batteries substantially equalizes. In some examples, thereafter, the controller may be configured to cause the other of the first switch or the second switch associated with the lower state of charge battery to electrically connect the lower state of charge battery to the power output of the power circuit, for example, without connecting the (previously) lower state of charge battery to the power output through a current limiting device.

In some vehicles, the vehicle may include two or more electric motors, including at least a first electric motor and a second electric motor, configured to provide torque for propulsion of the vehicle. The controller may be configured to activate one or more of the first switch or the second switch to connect one or more of the first battery or the second battery to the power output to supply electric power to at least one of the two or more electric motors. In some examples, either or both of the batteries may supply electric power to either or both of the first electric motor and the second electric motor. This may provide system redundancy, so that if any one of the batteries or any one of the electric motors is unable to be operated, the other(s) of the batteries and/or the other(s) of the electric motors may be used to operate to the vehicle.

In some examples, the vehicle may also include vehicle systems to autonomously control operation of the vehicle. In some such examples, the electrical system may include a third switch configured to selectively electrically connect and disconnect the vehicle systems to the power output of the power circuit. In further examples of such systems, a voltage supplied to the vehicle systems may be different from (e.g., lower than) voltage supplied to other systems (e.g., electric motors).

This disclosure is also generally directed to a method for operating an electrical system including a power circuit configured to provide a power output, and at least two batteries. The method may include identifying a first battery of the electrical system having a higher state of charge than a state of charge of a second battery of the electrical system, and electrically connecting the first battery to the power output of the power circuit. In some examples, the first and second batteries may be connected in parallel with one another. The method may also include electrically connecting the first battery to the second battery through a current limiting device to increase the state of charge of the second battery from the first battery (e.g., by charging the second battery from the first battery), and electrically connecting the second battery to the power output of the power circuit, for example, when the voltage difference between the respective voltages of the batteries is sufficiently low (e.g., below the threshold difference) to connect the second battery to the power circuit without excessively heating or damaging other components of the electrical system. In some examples, electrically connecting the second battery to the power output includes connecting the second battery to the power output without providing a current limiting device between the second battery and the power output.

Some examples of the method may include predicting a load on the power circuit, and electrically connecting the first battery to the second battery based at least in part on the predicted load on the power output of the power circuit. Some examples of the method may include identifying a first predicted load on the power output at a first time period, and identifying a second predicted load on the power output during a second time period. The method may also include electrically connecting the first battery to the second battery during the second time period, for example, as described herein.

The techniques and systems described herein may be implemented in a number of ways. Example implementations are provided below with reference to the figures.

FIG. 1 is a perspective view of an example vehicle 100 including an example electrical system 102 shown in block diagram form. The example vehicle 100 may be configured to travel via a road network 104 from one geographic location to a destination carrying one or more occupants. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any electrically-powered devices or machines, including, for example, any ground-borne, airborne, or waterborne vehicle, including those ranging from vehicles that need to be manually controlled by a driver at all times, to those that are partially or fully autonomously controlled.

The example vehicle 100 may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, hydrogen power, any combination thereof, and/or any other suitable power sources. Although the example vehicle 100 has four wheels 106, the systems and methods described herein may be incorporated into vehicles having fewer or a greater number of wheels, tires, and/or tracks. The example vehicle 100 may have four-wheel steering and may operate generally with equal performance characteristics in all directions, for example, such that a first end 108 of the vehicle 100 is the front end of the vehicle 100 when travelling in a first direction 110, and such that the first end 108 becomes the rear end of the vehicle 100 when traveling in the opposite, second direction 112, as shown in FIG. 1. Similarly, a second end 114 of the vehicle 100 is the front end of the vehicle 100 when travelling in the second direction 112, and such that the second end 114 becomes the rear end of the vehicle 100 when traveling in the opposite, first direction 110. These example characteristics may facilitate greater maneuverability, for example, in small spaces or crowded environments, such as parking lots and urban areas.

As shown in FIG. 1, the vehicle 100 includes a chassis 116 coupled to the four wheels 106 and configured to carry and protect the occupants of the vehicle 100 as it travels from a location to a destination via a route on the road network 104. The example electrical system 102 of the vehicle 100 includes a power circuit 118 including two or more batteries 120 connected in parallel with one another. The example electrical system 102 shown in FIG. 1 includes a first battery 120A, a second battery 120B, . . . and an Nth battery 120N connected in parallel with one another in the power circuit 118. The example electrical system 102 also includes vehicle systems 122 coupled to the power circuit 118 and configured to provide power to the vehicle 100, for example, as explained herein. In addition, the example electrical system 102 includes one or more electric motors 124 coupled to the chassis 116 and configured to provide torque to one or more of the wheels 106 for propulsion of the vehicle 100. Although not shown, the vehicle 100 may also include one or more internal combustion engines and/or other types of engine to supply power to the vehicle 100. In some examples, the electrical system 102 may include additional electrically-powered devices and/or systems, and the vehicle systems 122, the electric motor(s) 124, and/or the other electrically-powered devices and/or systems may form an electric load on the power output of the power circuit 118, for which the power circuit 118 supplies electric power for operation.

The example electrical system 102 shown in FIG. 1 also includes an electrical system controller 126, which may be configured to selectively control the electrical connection of the batteries 120, the vehicle systems 122, the electric motor(s) 124, and/or other electrically-powered devices and/or systems to the power circuit 118. For example, the electrical system controller 126 may be in communication via a communication link 128 with one or more of the batteries 120, the vehicle systems 122, the electric motor(s) 124, and/or other electrically-powered devices. Although a single electrical system controller 126 is shown, the electrical system controller 126 may include more than a single controller, for example, to provide controller redundancy. For example, each battery 120 may be associated with a controller that controls only connection and/or operation of the associated battery. In some examples, the electrical system controller 126 may include one or more battery management systems configured to control operation of the batteries 120. In some examples, each battery 120 may be associated with a battery management system that controls only operation of the associated battery, or in some examples, a single battery management system may control operation of more than one battery 120. In some examples, the battery management system(s) may be incorporated into one or more of the controllers. In some examples, the battery management systems may be communicatively coupled to one another, such that any one battery management system may receive a signal from any, or all, other battery management systems indicating one or more parameters of the connected battery. Such parameters may include, as non-limiting examples, a state of charge, a voltage, an internal resistance, and the like.

Figure 2:
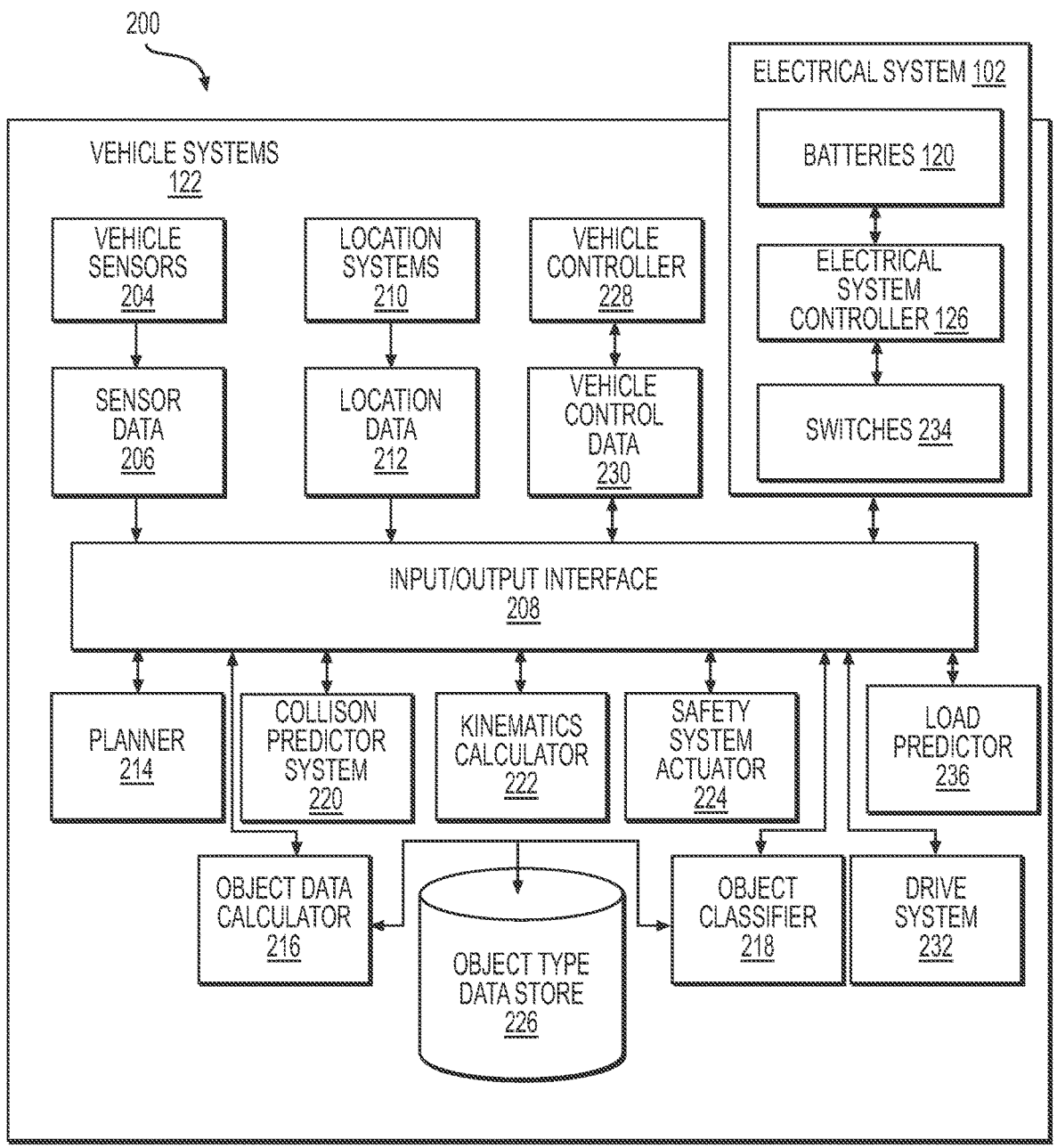
FIG. 2 is a block diagram showing an example architecture for vehicle systems and an example architecture for an example electrical system.

FIG. 2 is a block diagram of an example architecture 200 including vehicle systems 122 for controlling operation of the systems that provide data associated with operation of the vehicle 100, and that control operation of the vehicle 100. In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 200 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 200 shown in FIG. 2, the example vehicle systems 122 include a plurality of vehicle sensors 204, for example, configured to sense movement of the vehicle 100 through the environment, sense environmental data, such as the ambient temperature, pressure, and humidity, and/or sense objects in the environment surrounding the vehicle 100. In some examples, the vehicle sensors 204 may include sensors configured to identify a location on a map. The vehicle sensors 204 may include, for example, one or more light detection and ranging sensors (LIDAR), one or more cameras (e.g., RGB-cameras, intensity (grey scale) cameras, infrared cameras, depth cameras, stereo cameras, and the like), one or more radio detection and ranging sensors (RADAR), one or more sound navigation and ranging sensors (SONAR), one or more microphones for sensing sounds in the environment, such as sirens from law enforcement and emergency vehicles, and other sensors related to the operation of the vehicle 100. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 204 may also include, for example, inertial measurement units (IMUs), accelerometers, and gyroscopes. The vehicle sensors 204 may be configured to provide sensor data 206 representative of the sensed objects and signals to the vehicle systems 122 via, for example, an input/output (I/O) interface 208. Other types of sensors and sensor data are contemplated.

The example vehicle systems 122 also include location systems 210 configured to receive location information, including position and orientation data (e.g., a local position or local pose) from the vehicle sensors 204 and/or external sources, and provide location data 212 to other portions of the vehicle systems 122 via the I/O interface 208. The external sources may include global satellites for facilitating operation of a global positioning system (GPS) and/or a wireless network for communicating and receiving information related to the vehicle's location, such as map data. The location systems 210 may also include sensors configured to assist with navigation of the vehicle 100, such as wheel encoders for sensing the rotation of the wheels, inertial navigation sensors, such as gyroscopes and/or accelerometers, magnetometers, and/or cameras for obtaining image data for visual odometry or visio-inertial navigation.

The example vehicle systems 122 may also include one or more of a planner 214, an object data calculator 216, an object classifier 218, a collision predictor system 220, a kinematics calculator 222, and a safety system actuator 224. The vehicle systems 122 may be configured to access one or more data stores including, but not limited to, an object type data store 226. The object type data store 226 may include data representing object types associated with object classifications for objects detected in the environment.

The example vehicle systems 122 shown in FIG. 2 also include a vehicle controller 228 configured to receive vehicle control data 230, and based on the vehicle control data 230, communicate with a drive system 232 (e.g., a steering system, a propulsion system, suspension system, and/or a braking system) to control operation of the vehicle 100. For example, the vehicle control data 230 may be derived from data received from one of more of the vehicle sensors 204 and one or more of the planner 214, the object data calculator 216, the object classifier 218, the collision predictor system 220, the kinematics calculator 222, and the safety system actuator 224, and control operation of the drive system 232, so that operation and maneuvering of the vehicle 100 is executed.

In some examples, the planner 214 may be configured to generate data representative of a trajectory of the vehicle 100, for example, using data representing a location of the vehicle 100 in the environment and other data, such as local pose data, that may be included in the location data 212. In some examples, the planner 214 may also be configured to determine projected trajectories, at least one of which to be executed by the vehicle 100. As a non-limiting example, the planner 214 may calculate tens, hundreds, or thousands of projected trajectories concurrently (e.g., substantially simultaneously), each trajectory associated with a confidence level. Such a confidence level (or value) is indicative of an ability for the vehicle 100 to traverse the associated trajectory. In some examples, such projected trajectories may be calculated in accordance with a receding horizon technique, such that each projected trajectory only spans a short time (e.g., ranging from about 2 to about 10 seconds) into the future. The planner 214 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 214 may be configured to predict more than a single predicted object trajectory. For example, the planner 214 may be configured to predict multiple object trajectories based on, for example, probabilistic determinations or multi-modal distributions of predicted positions, trajectories, and/or velocities associated with an object.

In some examples, the object data calculator 216 may be configured to provide data representative of, for example, one or more of the pose (e.g., position and orientation) of an object in the environment surrounding the vehicle 100, an object track associated with the object (e.g., a historic position, velocity, acceleration, and/or heading of the object over a period of time (e.g., 5 seconds)), and an object classification associated with the object (e.g., a pedestrian, a vehicle, a bicyclist, etc.). For example, the object data calculator 216 may be configured to receive data in the form of sensor signals received from one or more of the vehicle sensors 204 and determine data representing one or more of the position and/or orientation in the environment of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses, designations, or subsets. For example, a "sedan" that is parked may have an additional subclass designation of being "static" or "being dynamic" if moving. In some examples, such an object classifier may also determine a predicted object behavior based on one or more of a portion of the sensor data or the object type.

In some examples, the collision predictor system 220 may be configured to use the predicted object behavior, the data representing the object type, the data representing the trajectory of the object, and/or the data representing the trajectory of the vehicle 100, to predict a collision between the vehicle 100 and the object.

In some examples, the kinematics calculator 222 may be configured to determine data representing one or more scalar and/or vector quantities associated with motion of objects in the environment, including, but not limited to, velocity, speed, acceleration, momentum, local pose, and/or force. Data from the kinematics calculator 222 may be used to compute other data, including, but not limited to, data representing an estimated time to impact between an object and the vehicle 100, and data representing a distance between the object and the vehicle 100. In some examples, the planner 214 may use data produced by the kinematics calculator 222 to estimate predicted object data. For example, the planner 214 may use current scalar and/or vector quantities associated with object to determine a likelihood that other objects in the environment (e.g., cars, motorcyclists, pedestrians, cyclists, and animals) are moving in an alert or controlled state, versus an un-alert or uncontrolled state. For example, the kinematics calculator 222 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 100.

In some examples, the safety system actuator 224 may be configured to activate one or more safety systems of the autonomous vehicle 100 when a collision is predicted by the collision predictor 220 and/or the occurrence of other safety related events, such as, for example, an emergency maneuver by the vehicle 100, such as hard braking or a sharp acceleration. The safety system actuator 224 may be configured to activate an interior safety system (e.g., including sending one or more signals to a deployment control system of an occupant protection system), an exterior safety system (e.g., including warning sounds and/or warning lights), the drive system 232, which may be configured to execute an emergency maneuver to avoid a collision, and/or any combination thereof. For example, the drive system 232 may receive data for causing a steering system of the vehicle 100 to change the travel direction of the vehicle 100, and a propulsion system of the vehicle 100 to change the speed of the vehicle 100 to alter the trajectory of vehicle 100 from an initial trajectory to a trajectory for avoiding a collision.

Some examples of the vehicle systems 122 may operate according to the following example. Data representing a trajectory of the vehicle 100 in the environment may be received by the vehicle controller 228. Object data associated with an object in the environment may be calculated. Sensor data 206 from one or more of the vehicle sensors 204 may be used to calculate such object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 216, based on the object data, may be used to determine data representing the object's location in the environment, data representing whether the object is moving, and data representing a classification associated with the object.

In some examples, the planner 214 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 220 may be used to predict a collision between the vehicle 100 and an object in the environment based on the object type, whether the object is moving, the trajectory of the vehicle 100, the predicted path of the object obtained from the planner 214. For example, a collision may be predicted based in part on the object type due to the object moving, the trajectory of the object being in potential conflict with the trajectory of the vehicle 100, and the object having an object classification that indicates the object is a likely collision threat. In some examples, such a collision prediction may also be based on a predicted object behavior. In some examples, each classification, or sub-classification, of objects may have a corresponding associated behavior. As a non-limiting example, a predicted behavior of a bicycle is to travel in relatively straight lines having a maximum speed.

In some examples, the safety system actuator 224 may be configured to actuate one or more portions of a safety system of the vehicle 100 when a collision is predicted. For example, the safety system actuator 224 may activate one or more of the interior safety systems, one or more of the exterior safety systems, and one or more of the components of the drive system 232 (e.g., the steering system, the propulsion system, and/or the braking system) via the vehicle controller 228. In some examples, the vehicle controller 228 may determine that the interior safety system will be activated based on some action of an object in the environment, and the vehicle control data 230 may include information configured to cause the vehicle controller 228 to activate one or more functions of the interior safety system, the exterior safety system, and the drive system 232.

As shown in FIG. 2, the example architecture 200 also includes the electrical system 102, which is in communication with the vehicle systems 122, for example, via the input/output interface 208. The example electrical system 102 shown in FIG. 2 includes the batteries 120, the electrical system controller 126, and a plurality of switches 234 in communication with the electrical system controller 126, for example, via the communication link 128 (FIG. 1). The switches 234 may be configured to be operated to selectively electrically connect and disconnect one or more of the batteries 120, the vehicles system 122, the electric motor(s) 124 (FIG. 1), and/or other electrically-powered devices and/or systems of the vehicle 100 to the power circuit 118 (FIG. 1), for example, as described herein. The switches 234 may include any individual or combination of electrically operated devices configured to selectively electrically connect the previously mentioned devices and/or systems to the power output of the power circuit 118, such as, for example, relays and/or digital switches, such as transistors and MOSFETs. Other types of switches are contemplated.

The example architecture 200 also includes a load predictor 236 configured to predict power demands of the electric load on the power circuit 118 and send one or more signals to the electrical system controller 126, for example, via the input/output interface 208. In some examples, the load predictor 236 may be in communication, for example, via the input/output interface 208, with the different portions of the vehicle systems 122 (e.g. the planner 214), which may provide one or more signals indicative of information associated with operation of the vehicle 100, for example, historical, geographic, and/or real-time information. Based at least on this information, the load predictor 236 may be configured to predict future load demands of the electric load on the power circuit 118.

For example, the load predictor 236 may receive one or more signals indicative of the route on which the vehicle 100 may travel to reach its destination and/or predicted operation of the vehicle 100, and based at least in part on this information, the load predictor 236 may determine the predicted power demands. For example, during operation on side streets when the speed of the vehicle 100 is predominately lower (e.g., 45 mph or less), the power demands of the one or more electric motors 124 may be lower relative to power demands during driving at highway speeds (e.g., 55 mph to 70 mph). The load predictor 236, based at least in part on the planned route for the vehicle 100, may determine the predicted power demands. For example, the load predictor 236 may receive one or more signals from the planner 214 indicative of determined trajectories associated with operation of the vehicle 100 on a highway, operation of the vehicle 100 on a side street, operation of the vehicle up a hill, or operation of the vehicle 100 on a street including a plurality of traffic signals. Upon receipt of the one or more signals, the load predictor 236 may predict one of a relatively high power demand for the trajectory associated with operation of the vehicle 100 on the highway (e.g., due to higher aerodynamic drag), a relatively low power demand for the trajectory associated with operation of the vehicle 100 on the side street (e.g., at speeds not exceeding about 45 mph and not including repeated accelerations from a stop), a relatively high power demand associated with the trajectory associated with operation of the vehicle 100 up the hill, or a relatively high power demand for the trajectory associated with operation of the vehicle 100 on the street including the plurality of traffic signals (e.g., due to repeated accelerations from a stop). As other non-limiting examples, an increased load may be associated with ascending an incline of a region as indicated by map data, variable torque requirements due to road segments having differing coefficients of friction (whether due to climate or terrain), emergency maneuvers to avoid obstacles entering the path of the vehicle, and the like.

Some examples of the load predictor 236 may use the predicted route of the vehicle 100 to provide one or more signals indicative of predicted power demands to the electrical system controller 126, which may control operation of one or more of the switches 234 of the electrical system 102 to charge a battery having a lower charge during time periods of reduced power demands. In some examples, the vehicle 100 may be configured to alter its predicted route and/or operation to adjust (e.g., reduce) the predicted power demands, for example, during charging of one or more of the batteries 120 with one or more batteries 120 having a higher charge. For example, if the electrical system 102 is charging one of the batteries 120 using a battery having a higher state of charge, the vehicle systems 122 of the vehicle 100 may change the planned route and/or operation of the vehicle 100 to a route and/or operation that would be predicted to have lower power demands. For example, a planned route on a highway to reach a destination may be changed to a route using side streets to reach the destination. Although shown as part of the vehicle systems 122, the load predictor 236 may be considered part of the electrical system 102. In some examples, the vehicle systems 122 may be considered part of the electrical system 102.

Figure 3:
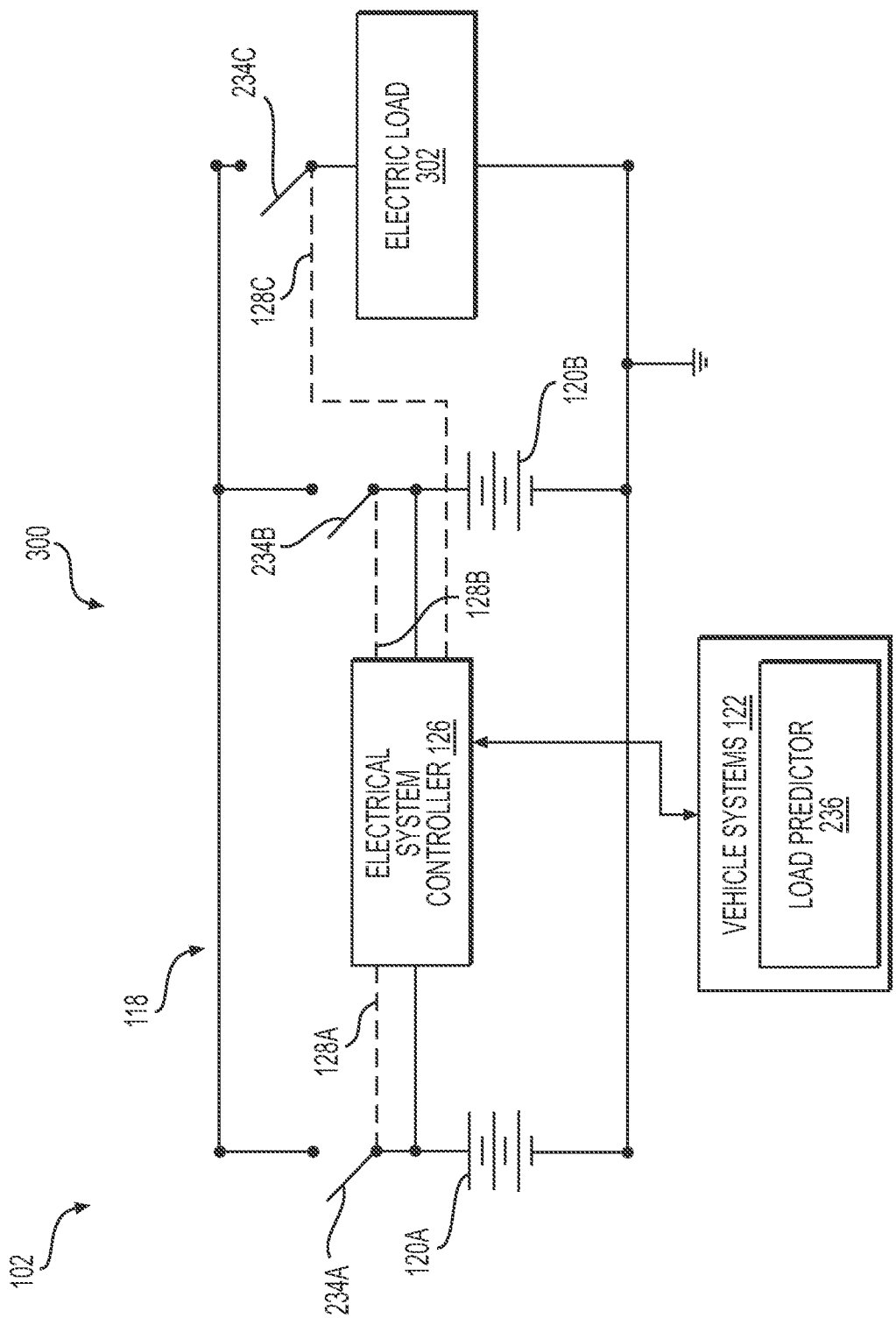
FIG. 3 is a schematic circuit diagram including an example electrical system including an example power circuit.

FIG. 3 is a schematic circuit diagram of an example circuit 300 including at least a portion of an example electrical system 102. The example circuit 300 includes an example power circuit 118 configured to supply electric power to an example electric load 302. For example, the electrical system 102 may be used to supply electric power to devices and machines, such as, for example, those previously described herein. The example electrical system 102 shown includes the example power circuit 118, which includes a first battery 120A electrically connectable to the power output of the power circuit 118, and a first switch 234A configured to selectively electrically connect and disconnect the first battery 120A to the power output of the power circuit 118. The example power circuit 118 also includes a second battery 120B electrically connectable to the power output of the power circuit 118, and a second switch 234B configured to selectively electrically connect and disconnect the second battery 120B to the power output of the power circuit 118. In the example shown, the power circuit 118 is configured such that when the first switch 234A and the second switch 234B electrically connect the first battery 120A and the second battery 120B, respectively, to the power output of the power circuit 118, the first battery 120A and the second battery 120B are in parallel with one another in the power circuit 118. In some examples, the power circuit 118 may be configured to supply electric power with only the first battery 120A electrically connected to the power output of the power circuit 118. In some examples, the power output of the power circuit 118 may be configured to supply electric power with only the second battery 120B electrically connected to the power output of the power circuit 118. In some examples, both the first battery 120A and the second battery 120B may be electrically connected to the power output of the power circuit 118 and supply electric power to the power output of the power circuit 118. Some examples of the electrical system 102 may include more than two batteries. In some examples, the electrical system 102 may also include a third switch 234C configured to selectively electrically connect and disconnect the electric load 302 to the power output of the power circuit 118.

The example electrical system 102 shown in FIG. 3 also includes an electrical system controller 126 electrically connected to the first switch 234A, the second switch 234B, and the third switch 234C via for example, a first communication link 128A, a second communication link 128B, and a third communication link 128C, respectively. Such communication links 128A, 128B, and 128C may be wired or wireless. In some examples, the electrical system controller 126 may be configured to control operation of one or more of the first switch 234A, the second switch 234B, or the third switch 234C. Some examples of the electrical system 102 may include a separate controller for each of the first battery 120A and the second battery 120B, and for examples including more than two batteries, the electrical system 102 may include more than two controllers, such as, for example, one controller for each of the batteries 120. In some examples, the electrical system 102 may include one or more separate controllers for the electric load 302. Other electrical devices and/or electrical systems may be coupled to the power output of the power circuit 118. Although not shown in FIG. 3, the electrical system 102 may also include other components, such as, for example, fuses, circuit breakers, surge protectors, resistors, capacitors, transistors, current sensors, voltage sensors, etc., for increasing safety, facilitating operation, and/or improving operation.

As shown in FIG. 3, the electrical system 102 may also include the load predictor 236 in communication with the electrical system controller 126. Some examples of the load predictor 236 may be part of the vehicle systems 122, for example, as shown in FIG. 3. In some examples, the load predictor 236 may be separate from the vehicle systems 122, but may be in communication with the vehicle systems 122, for example, as described herein. In some examples, the load predictor 236 may be configured to predict power demands of the electric load 302 and send one or more signals indicative of the predicted power demands to the electrical system controller 126. For example, the load predictor 236 may use various information, for example, historical, geographic, and/or real-time information received from the vehicle systems 122 and/or from one or more sources remote from the vehicle 100, to predict future load demands of the electric load 302. In some examples, the electrical system controller 126 may be configured to activate one or more of the first switch 234A, the second switch 234B, the third switch 234C, or other switches to connect one or more of the first battery 120A, the second battery 120B, and/or additional batteries, respectively, to the power output of the power circuit 118 based at least in part on the one or more signals indicative of the predicted power demands.

In some examples, the electrical system controller 126 may be configured to receive one or more first signals indicative of the state of charge (e.g., voltage) associated with the first battery 120A and one or more second signals indicative of the state of charge (e.g., voltage) associated with the second battery 120B. In some examples, the electrical system controller 126 may control operation of one or more of the first switch 234A or the second switch 234B (and/or additional switches), such that the associated with the first battery 120A and the voltage associated with the second battery 120B are substantially equalized (e.g., within technical tolerances). In the example shown, the first battery 120A and the second battery 120B are electrically connected to one another in parallel, and if the difference between the voltage of the first battery 120A and the voltage of the second battery 120B is excessive (e.g., greater than a threshold difference), electrically connecting the first battery 120A and the second battery 120B to one another in parallel may result in a large current surge that may overheat and/or damage components of the electrical system 102. Thus, controlling equalization of the voltages of the first battery 120A and the second battery 120B may be desirable.

Figure 4:
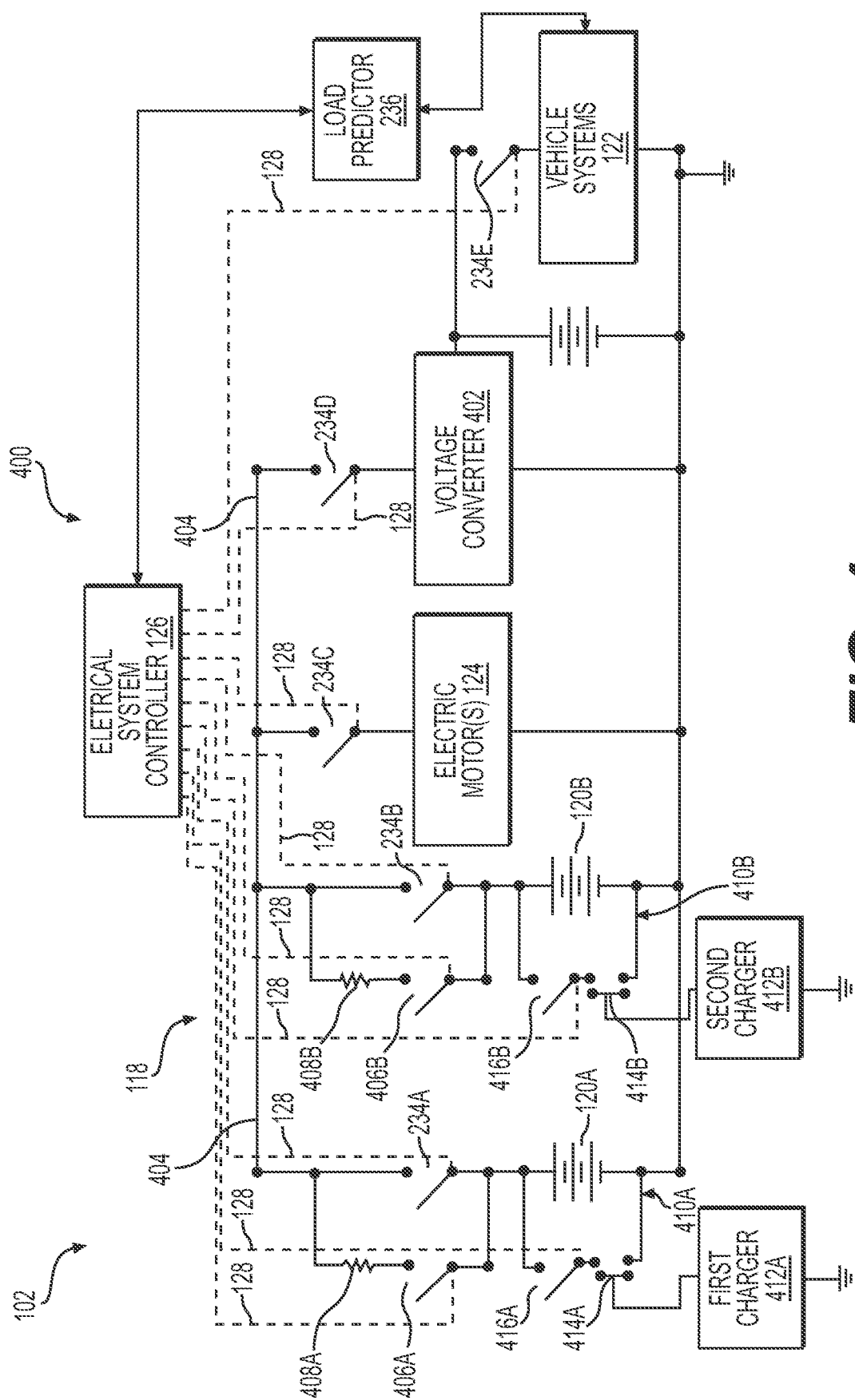
FIG. 4 is a schematic circuit diagram including an example electrical system including another example power circuit.

FIG. 4 is a schematic circuit diagram of an example circuit 400 including at least a portion of an example electrical system 102. The example circuit 400 includes an example power circuit 118 configured to supply electric power to an example electric load, such as, for example, an electric load associated with a vehicle, such as the example vehicle 100 described herein. For example, electric load may include one or more electric motors 124, a voltage converter 402 (e.g., a low voltage converter, a high voltage converter, or a converter for any voltage), vehicle systems 122, and/or any other electrically-powered devices and/or systems associated with the circuit 400. In addition, the electrical system 102 may be used to supply electric power to other devices and machines, such as, for example, those previously described herein. The voltage converter 402 may be configured to convert the voltage provided by the first battery 120A and/or the second battery 120B to a lower voltage power supply for operating electrically-powered devices that use a reduced voltage, such as, for example, some examples of the vehicle systems 122. For example, the first battery 120A and/or the second battery 120B may supply 80 volts (or any other desired voltage, such as, for example, 400 volts) to a power bus 404 of the power output of the power circuit 118, and the voltage converter 402 may be configured to reduce the voltage supplied from the power bus 404 to 24 volts. Other power bus voltages and reduced voltages are contemplated.

The example power circuit 118 shown in FIG. 4 includes a first battery 120A electrically connectable to the power output of the power circuit 118, and a first switch 234A configured to selectively electrically connect and disconnect the first battery 120A to the power output of the power circuit 118. The example electrical system 102 also includes a second battery 120B electrically connectable to the power output of the power circuit 118, and a second switch 234B configured to selectively electrically connect and disconnect the second battery 120B to the power output of the power circuit 118. In the example shown, the power circuit 118 is configured such that when the first switch 234A and the second switch 234B electrically connect the first battery 120A and the second battery 120B, respectively, to the power output of the power circuit 118, the first battery 120A and the second battery 120B are in parallel with one another in the power circuit 118. The power circuit 118 shown in FIG. 4 may be configured to supply electric power via either or both the first battery 120A and the second battery 120B, for example, as outlined herein.

The example power circuit 118 shown in FIG. 4 also includes a third switch 234C configured to selectively electrically connect and disconnect the electric motor(s) 124 to the power output of the power circuit 118, and a fourth switch 234D configured to selectively electrically connect and disconnect the voltage converter 402 to the power output of the power circuit 118. Some examples may include fifth switch 234E configured selectively electrically connect and disconnect the vehicle systems 122 to the power output of the power circuit 118. In some examples, the electrical system controller 126 may communicate with one or more of the first switch 234A, the second switch 234B, the third switch 234C, the fourth switch 234D, or the fifth switch 234E via, for example, separate or combined communication links 128, for example, as shown in FIG. 4, so the electrical system controller 126 may send one or more signals to operate one or more of the switches 234.

The example power circuit shown in FIG. 4 may be configured to control equalization of the states of charge of the first battery 120A and the second battery 120B. The concepts outlined with respect to FIG. 4 may be extended to more than two batteries. The example electrical system 102 shown in FIG. 4 includes a first secondary switch 406A and a first current limiting device 408A (e.g., a resistor) electrically connected in parallel with the first switch 234A, and a second secondary switch 406B and a second current limiting device 408B (e.g., a resistor) electrically connected in parallel with the second switch 234B. In FIG. 4, the current limiting devices 408A and 408B are shown schematically as resistors for clarity, but as explained herein, the current limiting devices may not necessarily be resistors. The current limiting devices 408A and/or 408B may include any device or group of devices that serves to regulate current, such as, for example, one or more resistors, one or more electric loads, and/or one or more devices that dissipate electric load. In some such examples, the electrical system controller 126 may be configured to determine that either the first battery 120A or the second battery 120B has a higher state of charge, and designate the battery having the higher state of charge as the higher state of charge battery and the battery having the lower state of charge as the lower state of charge battery. The electrical system controller 126 may also be configured cause either the first switch 234A or the second switch 234B associated with the higher state of charge battery to electrically connect the higher state of charge battery to the power output of the power circuit 118. The electrical system controller 126 may also cause either the first secondary switch 406A or the second secondary switch 406B to electrically connect the lower state of charge battery to the higher state of charge battery, thereby charging the lower state of charge battery via the higher state of charge battery. In some examples, the electrical system controller 126 may communicate with one or more of the first secondary switch 406A or the second secondary switch 406B via, for example, separate or combined communication links 128, as shown in FIG. 4, so the electrical system controller 126 may send one or more signals to operate one or more of the secondary switches 406.

For example, during normal operation of the electrical system 102, the first battery 120A and the second battery 120B may be electrically connected to the power output of the power circuit 118 to supply power to the power output of the power circuit 118. However, there may be conditions in which the state of charge of the first battery 120A may differ from the state of charge of the second battery 120B and/or the voltage output of the first battery 120A may differ from the voltage output of the second battery 120B. If there is a large enough disparity, when the first and second batteries are electrically connected to one another, it may create a current surge in the electrical system 102 that may result in overheating and/or damage to components of the electrical system 102. Such disparities may occur, for example, if one of the batteries is replaced with a battery having a higher or lower state of charge and/or voltage output relative to other batteries of the electrical system 102, if one of the batteries has been recharged, but another of the batteries has not been recharged, and/or if there is a malfunction of one of the batteries.

In some examples, the electrical system 102 may be configured to determine whether there is a difference between the state of charge and/or voltage output between two of the batteries of the electrical system 102, and if so, use the battery having the higher state of charge and/or voltage output to charge the battery having the lower state of charge and/or voltage output in a controlled manner that does not cause overheating and/or damage to other components of the electrical system 102.

For example, upon start-up of the electrical system 102, the electrical system controller 126 may determine whether the first battery 120A or the second battery 120B has a higher state of charge and/or a higher output voltage, and designate it as the higher state of charge battery. If the electrical system controller 126 determines that the difference between the state of charge and/or the output voltage is greater than a threshold difference (e.g., a difference that might cause overheating and/or damage to one or more of the components of the electrical system 102 when the first battery 120A and the second battery 120B are connected to one another), the electrical system controller 126 may be configured to use the voltage output of the first battery 120A to charge the second battery 120B in a controlled manner, for example, until the difference reaches the threshold difference or less. The threshold difference may be a predetermined voltage difference, or voltage difference calculated in real-time, that is sufficiently low to prevent excessive heating and/or damage to the portions of the electrical system 102 when the lower state of charge battery is connected to the power output of the power circuit 118 and the higher state of charge battery.

For example, the electrical system controller 126 may be configured to determine that he first battery 120A has a higher state of charge and/or voltage output than the second battery 120B. The electrical system controller 126 may also be configured to cause the first switch 234A to electrically connect the first battery 120A to the power output of the power circuit 118 (e.g., by closing the first switch 234A), while causing the second switch 234B to continue to keep the second battery 120B disconnected from the power output of the power circuit 118 (e.g., by keeping the second switch 234B open). The electrical system controller 126 may thereafter cause the second secondary switch 406B to connect the second battery 120B to the first battery 120A through the second current limiting device 408B, to thereby begin charging the second, lower state of charge, battery 120B using the first, higher state of charge, battery 120A. The second current limiting device 408B may be configured to prevent a current surge in the electrical system 102 when the second secondary switch 406B causes the first battery 120A and the second battery 120B to connect to one another. In some examples, when the electrical system controller 126 determines that the state of charge and/or voltage output difference is below the threshold difference, the electrical system controller 126 may be configured to connect the second battery 120B to the power output of the power circuit 118 by causing the second switch 234B to connect the second battery 120B to the power output of the power circuit 118 (e.g., by closing the second switch 234B), and causing the second secondary switch 406B to disconnect the second current limiting device from the power output of the power circuit 118 (e.g., by opening the second secondary switch 406B).

In some examples, when the electrical system controller 126 determines that the second battery 120B has a higher state of charge and/or output voltage than the first battery 120A, the electrical system controller 126 may cause the first switch 234A and first secondary switch 406A to operate as described above respect to the second switch 234B and the second secondary switch 406B, with the first current limiting device 408A serving the same or similar function as the function described above with respect to the second current limiting device 408B. In this example manner, some examples of the electrical system 102 may be configured to use a battery or batteries having a higher state of charge and/or output voltage to charge a battery or batteries having a lower state of charge and/or output voltage without causing a current surge that might damage components of the electrical system 102, for example, when the difference is greater than a threshold difference.

The example electrical system 102 shown in FIG. 4 also includes a load predictor 236 in communication with the electrical system controller 126 via, for example, a communication link 128. In some examples, the load predictor 236 may be configured to predict power demands of the one or more electric motors 124, the voltage converter 402, the vehicle systems 122, and/or other electrically-powered devices and/or systems. In some example, the load predictor 236 may be configured to send one or more signals indicative of the predicted power demands to the electrical system controller 126. The load predictor 236 may use various information, for example, historical, geographic, and/or real-time information, to predict future load demands of the electric load on the power circuit 118, for example, as described herein.

In some examples, the electrical system controller 126 may be configured to activate one or more of the first switch 234A or the second switch 234B to connect one or more of the first battery 120A or the second battery 120B, respectively, to the power output of the power circuit 118 based at least in part on the one or more signals indicative of the predicted power demands. For example, the electrical system 102 may be incorporated into a vehicle, such as the example vehicle 100 described herein, and the load predictor 236 may be configured to predict power demands associated with the vehicle 100. For example, electrical system controller 126 may be configured to determine whether there is a difference between the state of charge and/or voltage output between two of the batteries of the electrical system 102, and if so, use the battery having the higher state of charge and/or voltage output to charge the battery having the lower state of charge and/or voltage output in a controlled manner that does not cause overheating and/or damage to other components of the electrical system 102, for example, as disclosed herein. In some examples, the electrical system controller 126 may be configured to control the charging of the lower state of charge battery using the higher state of charge battery based at least in part on the one or more signals indicative of the predicted power demands received from the load predictor 236. In some examples, this may result in more efficient charging of the lower state of charge battery using the higher state of charge battery.

For example, when the electrical system 102 is charging a lower state of charge battery using a higher state of charge battery, and the difference in state of charge between the two batteries is greater than the threshold difference, the electrical system controller 126 may cause the lower state of charge battery to be charged by continuing to prevent the lower state of charge battery from being connected to the power output of the power circuit 118, and closing the secondary switch associated with the lower state of charge battery, so that the higher state of charge batter is electrically connected to the lower state of charge battery through the current limiting device associated with the secondary switch and lower state of charge battery. As discussed herein, this may prevent a current surge that might occur if the lower state of charge battery were electrically connected to the power output of the power circuit 118 when the state of charge and/or voltage difference between higher state of charge battery and the lower state of charge battery is greater than the threshold difference. The current limiting device associated with the lower state of charge battery may prevent this from occurring. However, relying on the current limiting device may result in energy losses that reduce the operating efficiency of the electrical system 102, particularly if the power demands on the power circuit 118 are relatively high. For example, if the power demands are relatively lower, the lower state of charge battery may be more efficiently charged by the higher state of charge battery.

In some examples, the load predictor 236 may be used to more efficiently charge the lower state of charge battery using the higher state of charge battery when the power demands on the power circuit 118 are relatively lower. For example, during operation of the vehicle 100 including the example electrical system 102, on side streets when the speed of the vehicle 100 is predominately lower, the power demands of the one or more electric motors 124 may be lower relative to power demands during driving at highway speeds. Thus, it may be more efficient to charge the lower state of charge battery using the higher state of charge battery while the vehicle 100 is operating on the side streets relative to charging the lower state of charge battery while the vehicle 100 is operating on the highway. Other operating considerations may also require relatively lower power demands, and thus, may also be used to increase the efficiency of charging the lower state of charge battery. Some examples of the load predictor 236 may use the predicted route of the vehicle 100 to provide one or more signals indicative of predicted power demands to the electrical system controller 126, which may control operation of one or more of the switches 234 of the electrical system 102 to charge a battery 120 having a lower charge during time periods of reduced power demands. In some examples, once the electrical system controller 126 determines a time period during which the lower state of charge battery should be charged using a higher state of charge battery, the electrical system controller 126 may initiate and/or control charging of the lower state of charge battery at the determined time period, for example, as described previously herein by selectively causing one or more of the first switch 234A, the second switch 234B, the first secondary switch 406A, or the second secondary switch 406B to electrically connect and disconnect the first battery 120A and the second battery 120B to the power output of the power circuit 118 and/or to one another.

In some examples, the vehicle 100 may be configured to alter its predicted route and/or operation to adjust (e.g., reduce) the predicted power demands, for example, during charging of one or more of the batteries 120 with one or more batteries having a higher charge. For example, if the electrical system 102 is charging one of the batteries 120 using a battery having a higher state of charge, control systems (e.g., the vehicle systems 122) of the vehicle 100 may change its route to a route that would be predicted to have lower power demands. For example, a planned route on a highway to reach a destination may be changed to a route using side streets to reach the destination. For example, the electrical system controller 126 may communicate with the vehicle systems 122, and the vehicle systems 122 may alter the route accordingly.

In some examples, the electrical system 102 may also include a first charging circuit 410A electrically coupled to the power output of the power circuit 118 in parallel with the first battery 120A to supply charge to the first battery 120A, and a second charging circuit 410B electrically coupled to the power output of the power circuit 118 in parallel with the second battery 120B to supply charge to the second battery 120B, for example, as shown in FIG. 4. In some such examples, the electrical system controller 126 may be configured to operate one or more of the first switch 234A or the second switch 234B to cause charging of one or more of the first battery 120A or the second battery 120B concurrently (e.g., substantially simultaneously) or independently of one another. In some examples, a single charger may be used to charge either or both the first battery 120A and the second battery 120B concurrently (e.g., substantially simultaneously). For example, the electrical system 102 shown in FIG. 4 may be configured to be electrically coupled to a first charger 412A, for example, in parallel with the first battery 120A, and a second charger 412B, for example, in parallel with second battery 120B. In the example shown, respective first and second electrical connectors 414A and 414B (e.g., plugs) electrically connected to the first charger 412A and the second charger 412B, respectively, may be configured to selectively connect the first charger 412A and/or the second charger 412B to the first charging circuit 410A and the second charging circuit 410B. In some examples, the first charging circuit 410A and/or the second charging circuit 410B may include a first charger switch 416A and/or a second charger switch 416B, respectively, configured selectively electrically connect and disconnect the first charging circuit 410A and/or the second charging circuit 410B to the power output of the power circuit 118. In some examples, the first charger switch 416A and/or the second charger switch 416B may be in communication via separate or combined communication links 128 with the electrical system controller 126. In some examples, the electrical system controller 126 may be configured to cause the first charger switch 416A and/or the second charger switch 416B to operate such that the first battery 120A and the second battery 120B may be charged independently from one another and/or concurrently with one another (e.g., substantially simultaneously with one another within technical tolerances), for example, without creating an undesirable current surge, as explained herein. In some examples, the electrical system controller 126 may be configured to operate the first switch 234A, the first secondary switch 406A, the second switch 234B, and/or the second secondary switch 406B, for example, as described herein to avoid an undesirable current surge during charging of the first battery 120A and/or second battery 120B. In some examples, during charging of the first and second batteries 120A and 120B, the first secondary switch 406A and the second secondary switch 406B may be activated (e.g., concurrently) to electrically connect the first and second batteries 120A and 120B to the power output of the power circuit 118 through the first and second current limiting devices 408A and 408B, respectively, and either the first switch 234A or the second switch 234B may be activated to electrically connect either the first battery 120A or the second battery 120B to the power output of the power circuit 118. This example strategy facilitates concurrent charging both the first and second batteries 120A and 120B while still providing power to the vehicle systems 122. It is contemplated that these concepts may be extended to electrical systems having more than two batteries and/or more than two charge circuits.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 and the example circuits 300 and 400 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 and the example circuits 300 and 400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200 and/or circuits 300 and 400. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 and/or circuits 300 and 400 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 100 is discussed below.

Figure 5:
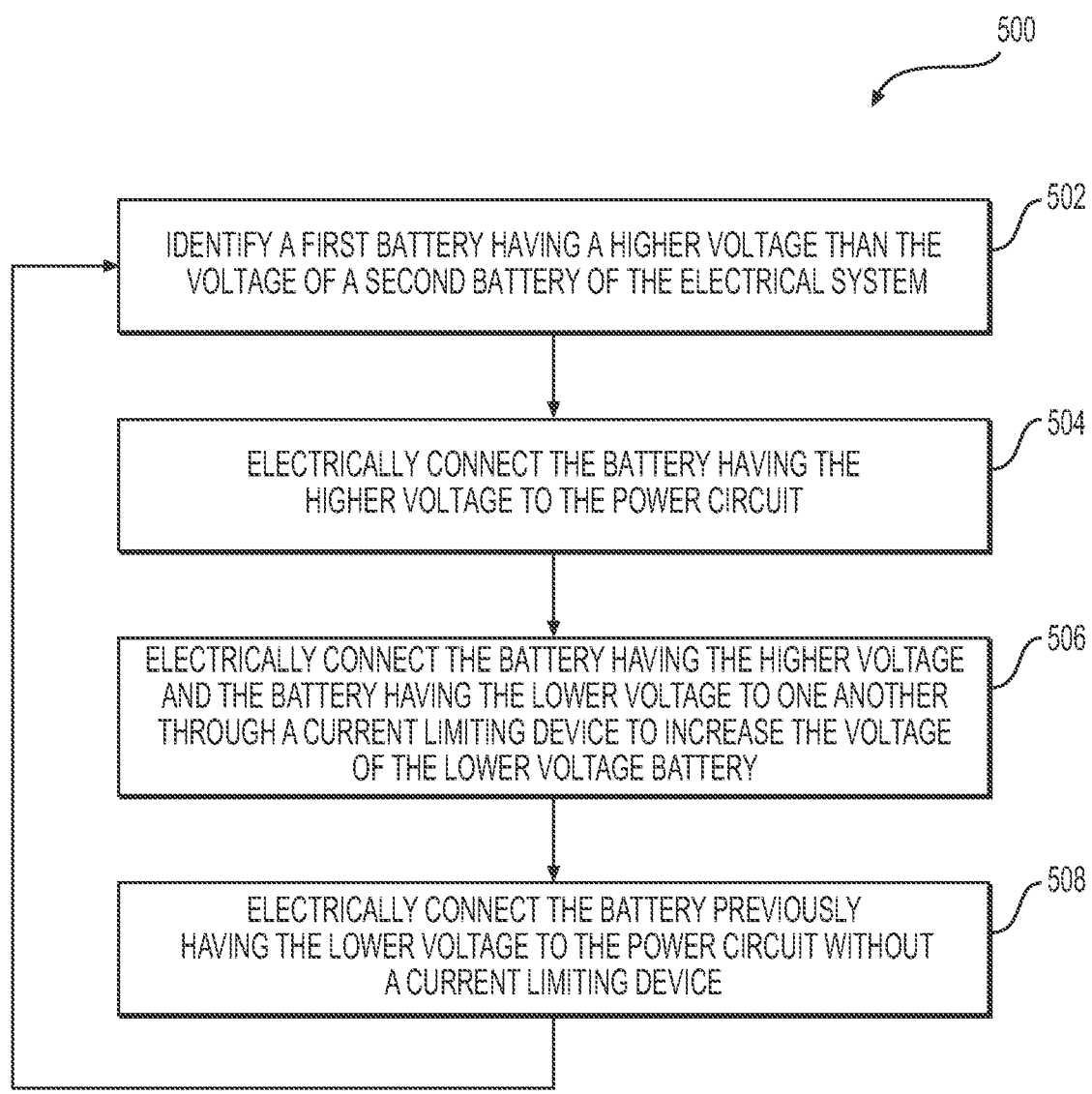
FIG. 5 is a flow diagram of an example process for operating an electrical system having two or more batteries.

FIG. 5 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an example process 500 for operating an electrical system including a power circuit configured to provide power output, and at least two batteries. At 502, the example process 500 may include identifying a first battery of the electrical system having a higher state of charge than the state of charge of a second battery of the electrical system. In some examples, an electrical system controller may receive one or more signals indicative of the state of charge of the first battery and the state of charge of the second battery and determine which of the first battery or the second battery has a higher state of charge, for example, as described herein.

At 504, the example process 500 may include electrically connecting the battery having the higher state of charge to a power output of the power circuit. For example, an electrical system controller may send one or more signals to one or more switches configured to selectively electrically connect and disconnect the first and second batteries to the power output of the power circuit, wherein the one or more signals cause the battery having the higher state of charge to be electrically connected to the power output of the power circuit.

At 506, the example process 500 may include electrically connecting the battery having the higher state of charge to the battery having the lower state of charge (e.g., through a current limiting device) to increase the state of charge of the battery having the lower state of charge via the battery having the higher state of charge. For example, the electric system controller may send one or more signals to one or more switches to cause the one or more switches to electrically connect the higher and lower state of charge batteries to one another. In some examples, an electrical system controller may perform this in a manner that prevents or reduces the likelihood that the power circuit will be subjected to a current surge when the higher voltage and lower voltages are connected to one another, for example, as described herein.

At 508, the example process 500 may also include electrically connecting the battery previously determined to have a lower state of charge to the power output of the power circuit, for example, without connecting the battery previously having the lower state of charge to the power output through a current limiting device. In some examples of the process 500, an electrical system controller may use the higher state of charge battery to increase the state of charge of the lower state of charge battery until the difference between the state of charge of the higher state of charge battery and the state of charge of the lower state of charge battery is less than a threshold difference in state of charge, for example, as explained herein.

Some examples of process 500 may also include predicting a load on the power circuit. For example, the electrical system may include a load predictor configured to predict power demands of an electric load on the power circuit and send one or more signals indicative of the predicted power demands on the electrical system controller. In some such examples, the process 500 may also include electrically connecting the higher state of charge battery and the lower state of charge battery to one another based at least in part on the predicted load on the power circuit. For example, the process 500 may include identifying a first predicted load on the power circuit at a first time period, identifying a second predicted load on the power circuit during a second time period, and determining when the predicted load is lower. In some examples, the electrical system controller may electrically connect the higher state of charge battery and the lower state of charge battery during the time period consistent with the relatively lower predicted load. For example, an electrical system controller may be configured to connect the higher state of charge battery and the lower state of charge battery to one another and/or to the power circuit when the load on the power circuit is relatively lower rather than when the load on the power circuit is relatively higher, for example, as described herein. As a non-limiting example, the predicted load may be in response to one or more environmental conditions (e.g., a change in surface friction due to weather, an incline to ascend, a small child jumping in front of the vehicle necessitating an emergency maneuver, etc.) as determined by one or more sensors or systems of a vehicle, such as an electric vehicle.

Some examples of the process 500 may be incorporated into a start-up procedure for the electrical system, for example, as described herein. Some examples of the process may be incorporated into a process for substantially equalizing the state of charges of two or more batteries of an electrical system, for example, as described herein. Some examples of the process 500 may be incorporated into a process for charging one or more of the batteries of an electrical system including two or more batteries, for example, as described herein. Some examples of the process 500 may be incorporated into a process for supplying electric power to an electrically-powered device and/or machine, such as, for example, the example vehicle 100 described herein. Other processes may incorporate the example process 500.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating an electrical system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An electrical system configured to supply electric power to an electric motor of an electric vehicle, the electrical system comprising:
    a first battery characterized by a first charge state;
    a first switch configured to electrically connect the first battery to, and disconnect the first battery from, a power output of a power circuit;
    a second battery characterized by a second charge state, which is lower than the first charge state;
    a second switch configured to electrically connect the second battery to, and disconnect the second battery from, the power output of the power circuit;
    a third switch and a current limiting device electrically connected in series with each other and in parallel with the second switch, the third switch being configured to electrically connect the second battery to, and disconnect the second battery from, the first battery;
    a controller electrically connected to the first switch, the second switch, and the third switch, the controller being configured to control operation of the first switch, the second switch, and the third switch;
    a planner configured to determine a first predicted trajectory of the electric vehicle to a destination and a second predicted trajectory of the electric vehicle to the destination; and
    a load predictor in communication with the planner, the load predictor being configured to:
        predict, based on the first predicted trajectory, a first power demand of the electric motor;
        predict, based on the second predicted trajectory, a second power demand of the electric motor that is larger than the first power demand; and
        send a second signal indicative of the first power demand and the second power demand to the planner;
    wherein the planner is configured to determine, based on the first charge state being higher than the second charge state and on the second power demand being larger than the first power demand, to use the first predicted trajectory; and
    wherein the controller is configured to, based at least in part on the first charge state being higher than the second charge state and the determining to use the first predicted trajectory:
        close the first switch to connect the first battery to the power output of the power circuit while the second switch is open, and
        close, while the electric vehicle executes the first predicted trajectory, the third switch to connect the first battery to the second battery to charge the second battery from the first battery until a difference between the first charge state and the second charge state is within a specified threshold.

2. The electrical system of claim 1, wherein the load predictor is configured to:
    receive the first predicted trajectory and the second predicted trajectory from the planner;
    receive a third signal from the controller configured to determine power demands associated with the electric motor of the electric vehicle coupled to the power output; and
    predict, based at least in part on the third signal from the controller, the first power demand associated with the first predicted trajectory and the second power demand associated with the second predicted trajectory.

3. The electrical system of claim 2, wherein at least one of the first predicted trajectory or the second predicted trajectory comprise one of a trajectory associated with operation of the electric vehicle on a highway, a trajectory associated with operation of the electric vehicle on a side street, a trajectory associated with operation of the electric vehicle up a hill, or a trajectory associated with operation of the electric vehicle on a street comprising a plurality of traffic signals; and
    the load predictor is further configured to:
        predict one of a relatively high power demand for the trajectory associated with operation of the electric vehicle on the highway, a relatively low power demand for the trajectory associated with operation of the electric vehicle on the side street, a relatively high power demand associated with the trajectory associated with operation of the electric vehicle up the hill, or a relatively high power demand for the trajectory associated with operation of the electric vehicle on the street comprising the plurality of traffic signals.

4. The electrical system of claim 1, wherein the controller is configured to control operation of at least one of the first switch or the second switch such that the first charge state and the second charge state are equalized based at least in part on a third signal from the load predictor indicative of the first power demand.

5. The electrical system of claim 1, further comprising:
    a fourth switch and another current limiting device electrically connected in series with each other and in parallel with the first switch.

6. The electrical system of claim 1, wherein the controller is configured to:
    determine that the difference between the first charge state the second charge state is within the specified threshold; and
    cause the second switch to connect to the power output.

7. The electrical system of claim 1, wherein the first power demand is associated with a first time period and the second power demand is associated with a second time period, and
    wherein the controller is configured to close, based on the first power demand being smaller than the second power demand, the third switch during the first time period.

8. The electrical system of claim 1, further comprising:
    a first charging circuit electrically coupled in parallel with the first battery to supply charge to the first battery; and
    a second charging circuit electrically coupled in parallel with the second battery to supply charge to the second battery,
    wherein the controller is configured to operate at least one of the first switch or the second switch to cause charging of at least one of the first battery or the second battery concurrently or independently of one another.

9. The electrical system of claim 8, wherein the controller is further configured to charge the first battery and the second battery via a single charger.

10. The electrical system of claim 1, wherein the load predictor is configured to:
    receive an information signal indicative of information associated with operation of the electric vehicle comprising at least one of historical information, geographic information, or real-time information; and
    predict the power demands of the electric motor based at least in part on the information signal.

11. A method comprising:
receiving a first signal indicating a first charge state of a first battery is higher than a second charge state of a second battery, the first battery and the second battery being configured to provide power to an electric motor of a vehicle;
determining a first predicted trajectory of the vehicle to a destination and a second predicted trajectory of the vehicle to the destination;
predicting, based on the first predicted trajectory, a first power demand;
predicting, based on the second predicted trajectory, a second power demand;
determining the first power demand is lower than the second power demand;
determining, based on the first signal and on the first power demand being lower than the second power demand, to use the first predicted trajectory;
connecting, by a first switch and based at least on the vehicle executing the first predicted trajectory, the first battery to the electric motor, wherein a second switch between the second battery and the electric motor is open while the first predicted trajectory is executed; and
connecting, by a third switch in series with a current limiting device and based at least on the vehicle executing the first predicted trajectory, the first battery to the second battery until a difference between the first charge state and the second charge state is within a specified threshold.

12. The method of claim 11 further comprising, rerouting, based on the first signal indicating the first charge state is higher than the second charge state and on the first power demand being lower than the second power demand, from a current trajectory to the first predicted trajectory.

13. One or more non-transitory computer-readable media storing instructions that, when executed, cause one or more processors to perform operations comprising:
receiving a first signal indicating a first charge state of a first battery is higher than a second charge state of a second battery, the first battery and the second battery being configured to provide power to an electric motor of a vehicle;
determining a first predicted trajectory of the vehicle to a destination and a second predicted trajectory of the vehicle to the destination;
predicting, based on the first predicted trajectory, a first power demand;
predicting, based on the second predicted trajectory, a second power demand;
determining the first power demand is lower than the second power demand;
determining, based on the first signal and on the first power demand being lower than the second power demand, to use the first predicted trajectory;
connecting, by a first switch and based at least on the vehicle executing the first predicted trajectory, the first battery to the electric motor, wherein a second switch between the second battery and the electric motor is open while the first predicted trajectory is executed; and
connecting, by a third switch in series with a current limiting device and based at least on the vehicle executing the first predicted trajectory, the first battery to the second battery until a difference between the first charge state and the second charge state is within a specified threshold.

14. The one or more non-transitory computer-readable media of claim 13, wherein the operations further comprise, rerouting, based on the first signal indicating the first charge state is higher than the second charge state and on the first power demand being lower than the second power demand, from a current trajectory to the first predicted trajectory.

* * * * *